United States Patent [19]

Kohyama

[11] Patent Number: 4,460,057
[45] Date of Patent: Jul. 17, 1984

[54] VEHICULAR FRAME STRUCTURE

[75] Inventor: Mikihiro Kohyama, Saitama, Japan

[73] Assignee: Honda Giken Kogyo Kabushiki Kaisha, Tokyo, Japan

[21] Appl. No.: 400,469

[22] Filed: Jul. 21, 1982

[30] Foreign Application Priority Data

Jul. 24, 1981 [JP] Japan ................. 56-116919

[51] Int. Cl.$^3$ ............................................. B62K 19/30
[52] U.S. Cl. .................................... 180/210; 180/219; 280/281 R
[58] Field of Search ....... 280/281 R, 281 LP, 281 W, 280/281 B, 282; 180/210, 215, 219, 225

[56] References Cited

U.S. PATENT DOCUMENTS

| 1,796,339 | 3/1931 | Nicholson | 180/219 |
| 3,117,648 | 1/1964 | Landreth | 180/210 |
| 3,455,404 | 7/1969 | Hansen | 180/210 |

FOREIGN PATENT DOCUMENTS

| 920418 | 4/1947 | France | 280/281 R |
| 2045705 | 11/1980 | United Kingdom | 180/210 |

Primary Examiner—Joseph F. Peters, Jr.
Assistant Examiner—D. Lynn Fugate
Attorney, Agent, or Firm—Irving M. Weiner; Pamela S. Burt; Anthony L. Cupoli

[57] ABSTRACT

A frame structure for a low-floor type, small-sized vehicle. The frame structure comprises a pair of right and left plate members extending substantially fore to aft of the vehicle and having the thickness dimension thereof extending in a substantially transverse direction and the width dimension thereof extending in a substantially vertical direction and each being provided along at least one of the upper and lower edges thereof with an outwardly bent flange portion. The structure further includes a plurality of cross members which rigidly connect the plate members with each other.

The frame members of the structure are easy to manufacture and at the same time are reduced in the wall thickness thereof, and consequently are reduced in weight, without impairing the strength and rigidity thereof.

17 Claims, 10 Drawing Figures

VEHICULAR FRAME STRUCTURE

BACKGROUND OF THE INVENTION

1. Field of the Invention

The present invention relates to a vehicular frame structure. More particularly, the invention relates to a frame structure for vehicles of a low-floor, relatively small-sized type, such as scooter type motorcycles and similar three-wheeled and four-wheeled vehicles provided with engines.

2. Description of Relevant Art

The present applicant has previously proposed small-sized and lightweight three-wheeled and four-wheeled vehicles provided with engines and being of substantially the same size as two-wheeled vehicles. Such three-wheeled and four-wheeled vehicles with engines have external designs similar to those of low-floor type scooters, in consideration of ease of steering and of handling operations.

However, there has been substantial room for improvement of the frame structure of such vehicles, including scooters. For example, a pipe frame has heretofore been employed as the frame structure for such vehicles, however, such structure requires many forming steps, including bending, and forming is sometimes difficult. In addition, a number of mounting brackets are required for mounting electrical devices such as harnesses, in addition to clamps which directly support the harnesses, because the outer surface of the frame is curved and such devices are exposed on the outer surface of the frame. Moreover, fuel tank mounting brackets are required, in addition to the brackets for mounting electrical devices. The number of component parts is thus high, causing the structure of the vehicle to become considerably more complicated and the manufacture thereof more troublesome and complex, as well as requiring operations for mounting such brackets. Such additional provision of parts and additional mounting operations, together with the complexity and inconvenience attendant therewith, are disadvantageous with respect to cost, and the vehicles thus fabricated are not considered satisfactory with respect to weight reduction considerations.

The present invention effectively overcomes the various above-discussed problems associated with prior vehicles of the aforesaid types by providing an improved frame structure for such types of vehicles.

SUMMARY OF THE INVENTION

The present invention provides a frame structure in a low-floor type, small-sized vehicle, comprising a pair of right and left plate members extending substantially fore to aft of the vehicle and having the thickness dimension thereof extending in a substantially transverse direction and the width dimension thereof extending in a substantially vertical direction, each of the plate members being provided at at least one of the upper and lower edges thereof with an outwardly bent flange portion. The frame structure further comprises a plurality of cross members which rigidly connect the plate members with each other.

It is an object of the present invention to provide a frame structure in a low-floor type, small-sized vehicle which facilitates manufacture, provides protection of harnesses and other electrical devices, improves the mounting characteristics of such devices and the fuel tank, and provides a more simplified structure while attaining reduction in weight by thinning the walls of the component parts, while at the same time improving the strength and rigidity thereof.

The above and further objects, details and advantages of the present invention will become apparent from the following detailed description of preferred embodiments thereof, when read in conjunction with the accompanying drawings.

DETAILED DESCRIPTION OF PREFERRED EMBODIMENTS

Figure 1:
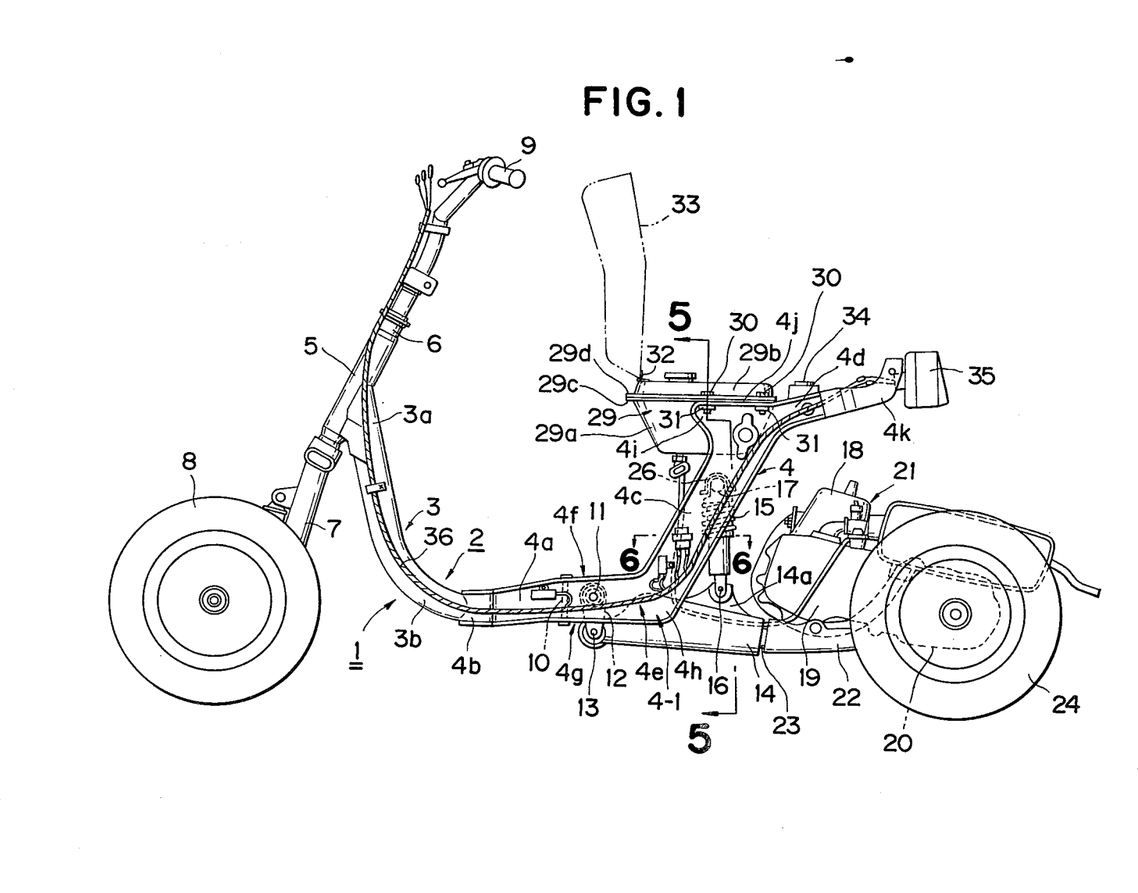
FIG. 1 is a side view showing the entire internal structure of a vehicle provided with a frame structure in accordance with a first embodiment of the present invention.
Figure 2:
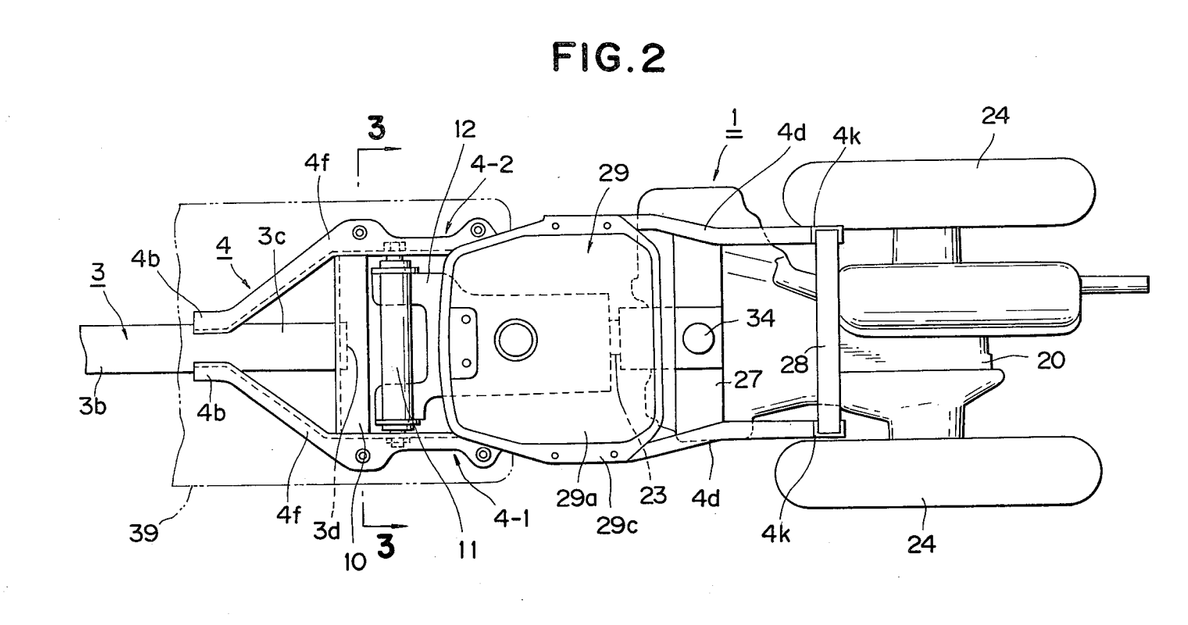
FIG. 2 is a plan view showing the construction of an intermediate portion and a rear portion of the vehicle of FIG. 1.

With reference to FIGS. 1 and 2, there is shown a frame 2 of a vehicle 1, the frame 2 comprising a front member 3 and a rear member 4. The front member 3 comprises a single, substantially L-shaped pipe of a somewhat large diameter having a curved side, and includes a forwardly and upwardly rising front portion 3a, to the forward end of which is fixed a head tube 5 by welding or other suitable means. To the head tube 5 is pivotably attached a fork-like front wheel supporting member 7 through a steering stem 6, and to the lower end of the front wheel supporting member 7 is attached a single front wheel 8 which comprises a steerable wheel. A handlebar 9 is secured to the upper end of the steering stem 6 which projects above the head tube 5.

The front member 3 is integrally provided with the aforesaid front portion 3a which extends obliquely downwardly, an intermediate portion 3b adjacent to the front portion 3a and curved obliquely downwardly and further rearwardly, and a rear portion 3c which extends rearwardly from portion 3b by a suitable length, the rear portion 3c being disposed in a relatively low position.

The rear member 4 comprises right and left members 4-1 and 4-2, the forward ends of which are fixed by welding or other suitable members to both sides of an intermediate portion in the longitudinal direction of the rear portion 3c. The members 4-1 and 4-2 are substantially mirror images of each other, and the front portions 4a thereof are disposed in a relatively low position and extend rearwardly from the rear portion 3c of the front member 3. More specifically, the members 4-1 and 4-2 have welded front end portions 4b welded to both sides of the rear portion 3c, from which the members 4-1 and 4-2 are bent and bulged rearwardly and obliquely outwardly so that they are wider than the front member 3 except the welded portions 4b, and are somewhat narrower than the spacing between two rear wheels 24. The members 4-1 and 4-2 extend rearwardly while the spacing therebetween remains narrower than the width of a floor member 39. The members 4-1 and 4-2 rise obliquely rearwardly from the rear parts 4h of the front portions 4a thereof so as to define intermediate portions 4c, and then bend and extend rearwardly from upper parts 4i of the intermediate portions 4c to define rear portions 4d.

Figure 3:
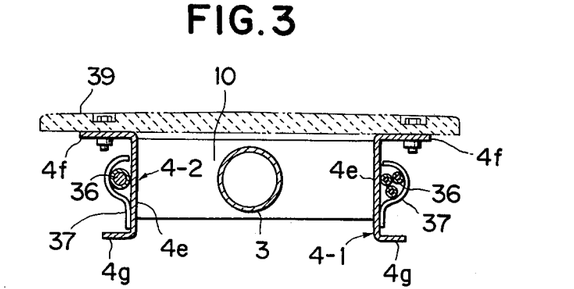
FIG. 3 is an enlarged sectional view taken along line 3—3 in FIG. 2.

Referring now to FIG. 3, the right and left members 4-1 and 4-2 are in the form of channels each having a grooved section which faces upwardly, the members 4-1 and 4-2 each comprising a substantially flat body 4e of a predetermined thickness, the bodies 4e of both members being opposed in spaced relation to each other in the transverse direction; and flange portions 4f and 4g which are bent outwardly from upper and lower ends, respectively of the body 4e.

Figure 4:
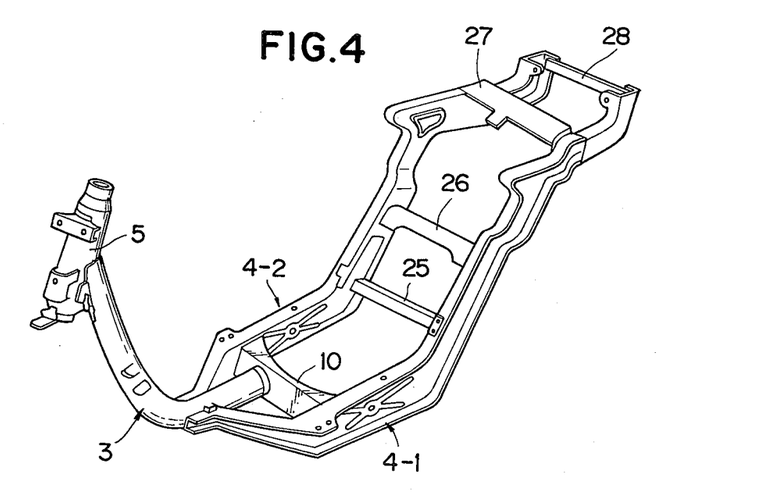
FIG. 4 is a perspective view of the entire frame structure shown in FIG. 1.

Referring again to FIGS. 1 and 2, with simultaneous reference to FIG. 4, the flange portions 4f and 4g are in such a positional relationship as to be vertically spaced at the front portion 4a of each of the members 4-1 and 4-2, are spaced substantially fore and aft at the intermediate portion 4c, and are again substantially vertically spaced at the rear portion 4d. The right and left members 4-1 and 4-2 having the flange portions 4f and 4g extending integrally and continuously from the front to rear portions are each integrally formed by being pressed from a steel plate.

The width of the members 4-1 and 4-2, i.e., the spacing between the flange portions 4f and 4g, is larger over an area extending from a lower part 4h to the upper part 4i of the intermediate portion 4c of each of the right and left members 4-1 and 4-2, and such width becomes largest at the upper part 4i of the intermediate portion 4c. A portion 4j of the flange portion 4f positioned at the upper end of the intermediate portion 4c is formed to extend substantially horizontally in the longitudinal direction.

Between right and left bulged bent portions of the front portions 4a of the right and left members 4-1 and 4-2 is mounted and fixed a first cross member 10 which is secured to a rear end 3d of the front member 3. Further, at the intermediate portions 4c of the right and left members 4-1 and 4-2, a second cross member 25 is mounted between lower portions of the flat portions 4e, as shown in FIG. 4.

A pin 11 is mounted behind the cross member 10 between the right and left front portions 4a of the rear member 4, and a link 12 depends pivotably from the pin 11. To the lower end portion of the link 12 is pivotably secured, through a pin 13, the front end portion of a swing joint 14 which extends behind the frame.

The swing joint 14 is provided on its intermediate portion with a bracket portion 14a to which is pivotably secured, by means of a pin 16, the lower end portion of a rear cushion unit 15, and the upper end portion of the rear cushion unit 15 is pivotably supported by a pin 17 which is in turn supported by a third cross member 26 mounted between the flat bodies 4e at the upper parts of the intermediate portions 4c of the right and left rear members 4-1 and 4-2, whereby the joint 14 is vertically pivotably supported with respect to the frame 2.

Behind the joint 14 there extends a rear frame 22 supported by a longitudinally extending support shaft 23. The rear frame 22 carries thereon a power unit 21, the power unit 21 comprising an integral combination of an engine 18, a crank case 19 and a transmission case 20. The frame 2 including the joint 14, i.e., the front portion of the vehicle, is capable of rolling to the right and left with the support shaft 23 as a fulcrum. Disposed on both right and left sides of the rear part of the transmission case 20 are the two rear wheels 24.

At the rear portions 4d of the right and left members 4-1 and 4-2, a fourth cross member 27 is mounted between the upper flange portions 4f, and a fifth cross member 28 is mounted between rear end portions 4k wherein the channels face inwardly. Thus, the right and left members 4-1 and 4-2 are disposed and connected in parallel with each other through the cross members 10 and 25-28 and are thereby imparted with suitable rigidity and strength.

Figure 5:
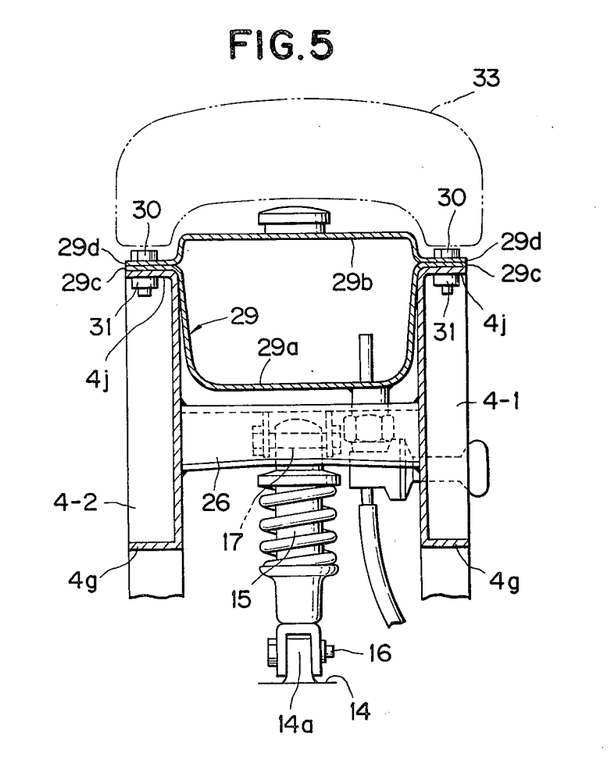
FIG. 5 is an enlarged sectional view taken along line 5—5 in FIG. 1.

Referring further to FIGS. 1 and 2, with simultaneous reference to FIG. 5, a fuel tank 29 is mounted and supported between the flange portions 4j formed at the upper ends of the intermediate portions 4c of the right and left members 4-1 and 4-2 of the rear frame member 4. The fuel tank 29 comprises an overlapped body formed of a deep dish-like lower member 29a joined with a shallow inverted dish-like upper member 29b. The lower member 29a and the upper member 29b are provided at the opposed ends thereof with outwardly bent flange portions 29c and 29d, respectively, which are overlapped and joined to define an integral body. The lower right and left flange portions 29c are arranged between the substantially horizontal flange portions 4j so that the lower member 29a is disposed between the upper parts 4i of the intermediate portion 4c, and bolts 30 are fitted through the flange portions 29c, 29d and 4j and tightened with nuts 31, whereby the need for mounting brackets for the fuel tank 29 on the frame 2 is eliminated, with the tank 29 being mounted and supported by utilizing the flat and horizontal flange portions 4f of the frame 2.

Because the tank 29 is mounted between the upper parts 4i of the intermediate portions 4c of the right and left members 4-1 and 4-2, it also functions as a cross member. The fuel tank 29 is supported at the intermediate and rear portions thereof by the flange portions 4j, while the front portion thereof projects forwardly and a hinge member 32 is fixed to an upper front end of the tank 29. To the hinge member 32 is pivotably secured a lower front end of a seat 33 so that the seat 33 can pivot vertically with the lower front end thereof as a fulcrum, i.e., the seat 33 is raised when the tank 29 is to be exposed and is lowered for use as a driver's seat. Both sides of the lower surface of the seat 33 are supported effectively by the frame-side flange portions 4j through the flange portions 29c and 29d of the tank 29. A support portion 34 for the lower surface of the rear portion of the seat 33 is mounted on the fourth cross member 27.

To each of the rear end portions 4i of the rear member 4 of the frame 2 is attached a tail light unit 35, while in front of the handlebar 9 there are mounted, though not shown, a headlight unit and blinker lamps. Various electrical devices, such as an engine starter relay and CDI may also be provided, and a wire harness 36 is provided for connecting the various lights and electrical devices to the battery, the harness 36 extending from front to rear.

Figure 6:
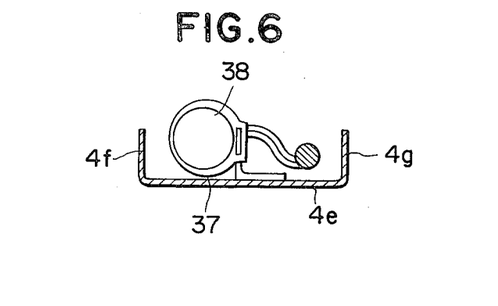
FIG. 6 is an enlarged sectional view taken along line 6—6 in FIG. 1.

Because the right and left members 4-1 and 4-2 of the rear member 4 of the frame 2 have outwardly opening channel-like or grooved sections, the harness 36 may be positioned and retained on the outside surface of the flat body 4e between the upper and lower flange portions 4f and 4g, i.e., along the groove, through a plurality of retainers 37 such as shown in FIGS. 3 and 6. The relay and CDI unit may also be retained on the outside surface of the body 4e along the groove. Large-sized components may be retained on the outside surface of the body 4e at the intermediate portion 4c where the spacing between the upper and lower flanges and the side area are larger than at the front portion 4a and rear portion 4d.

As will be understood from the foregoing, the aforesaid electrical devices are accommodated between the flange portions 4f and 4g, with the harness 36 facing the inside of such flange portions, and as shown in FIG. 6 by way of example, a relay 38 merely partially projects slightly outwardly from the flange portions 4f and 4g. Thus, such accessories can be substantially protected by only the retainers 37, without the need of attaching special mounting brackets therefor to the frame 2.

Figure 7:
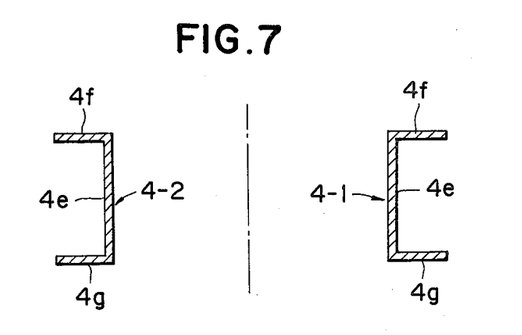
FIG. 7 is an enlarged transverse sectional view of a rear member of the frame structure shown in FIG. 1.

As shown in FIG. 7, because the frame 2 is formed of the right and left rear members 4-1 and 4-2 each having an outwardly opening channel section, it is possible to attain high strength and rigidity of the members per se, and consequently even if the members 4-1 and 4-2 are formed of a material of a selectively thinner wall thickness for reduction in weight and for facilitating forming operations, they are still superior in strength and rigidity. Moreover, the fuel tank 29 can be mounted and supported between the members 4-1 and 4-2 by utilizing the upper flange portions 4f of the channels without separately providing special brackets. Such construction is also advantageous with respect to support of the seat 33, i.e., the seat 33 is supported by the frame 2 through the rear portion of the tank 29 carried on the frame 2 and also through the flange portions 29c and 29d. Therefore, the tank 29 is not subjected to a substantial load and can thus be made thinner in wall thickness, permitting reduction in weight and ease of manufacture. Further, the harness 36 and other electrical devices are retained in the outwardly opened grooves of the channels, and such arrangement is advantageous with respect to protection of such devices, while eliminating the need for separate mounting brackets therefor, and contributes to the simplification of the frame structure in conjunction with the aforesaid arrangement of the fuel tank. In addition, even if the harness 36 should become loose, its loosened portion will be held by the lower flange portion 4g.

Figure 10:
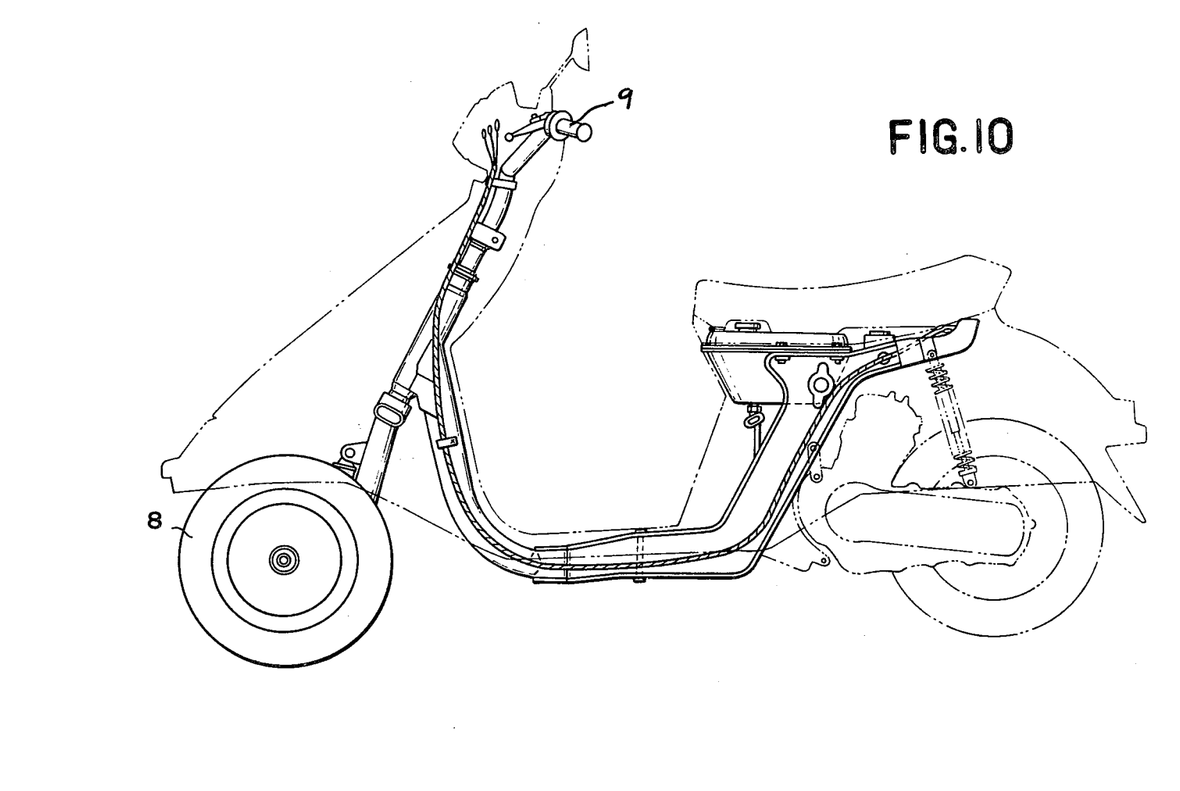
FIG. 10 is a side view of a scooter type vehicle provided with a frame structure in accordance with the present invention.

FIG. 10 shows the above-described frame structure according to the invention as applied to a scooter-type vehicle construction.

Figure 8:
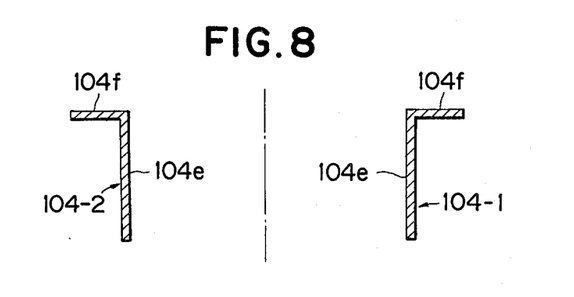
FIG. 8 is a view, similar to FIG. 7, of a frame structure in accordance with a second embodiment of the present invention.

Referring to FIG. 8, there are shown right and left rear frame members 104-1 and 104-2 each provided with only an upper flange portion 104f bent outwardly from the upper end of a body 104e, in accordance with a second embodiment of the invention.

Figure 9:
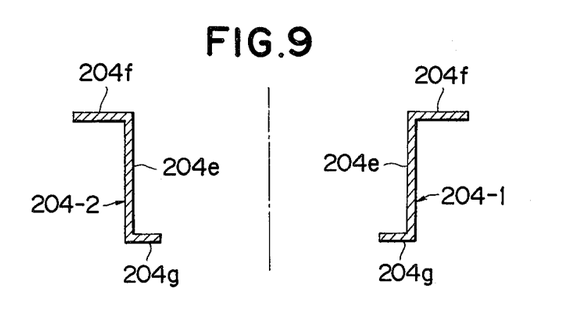
FIG. 9 is a view, similar to FIG. 7, of a frame structure in accordance with a third embodiment of the present invention.

Referring to FIG. 9, there are shown right and left frame members 204-1 and 204-2 each provided with a body 204e, the upper end of which is bent outwardly to form an upper flange portion 204f and the lower end of which is bent inwardly to form a lower flange portion 204g, in accordance with a third embodiment of the invention.

In the hereinabove described connection, it is not always necessary to form the front frame member with a single pipe as described in the first embodiment, and instead the right and left rear members may be extended up to the front portion of the vehicle. Alternatively, a front member comprising two parallel pipes and right and left rear members may be joined together.

Although there have been described what are at present considered to be the preferred embodiments of the invention, it will be understood that the invention may be embodied in other specific forms without departing from the spirit or essential characteristics thereof. The present embodiments are therefore to be considered in all respect as illustrative, and not restrictive. The scope of the invention is indicated by the appended claims rather than by the foregoing description.

I claim:

1. In a low-floor type, small-sized vehicle, a frame structure comprising:
   a pair of right and left plate members extending substantially fore to aft of said vehicle;
   each of said right and left plate members being provided at at least one of the upper and lower edges thereof with an outwardly bent flange portion;
   a plurality of cross members rigidly connecting said plate members with each other;
   each of said plate members comprising a substantially vertically extending intermediate portion, a front portion and a rear portion, said front portion and said rear portion extending substantially forwardly and rearwardly from the lower end and upper end, respectively, of said intermediate portion;
   said vehicle being provided with a seat; and
   said seat being substantially disposed on upper parts of said substantially vertically extending intermediate portions of said plate members.

2. A frame structure according to claim 1, further comprising:
   a front frame member having said front portions of said plate members fixed thereto.

3. A frame structure according to claim 2, wherein:
   said front frame member comprises a single pipe member; and
   said front portions of said plate members are bent inwardly and are fixed at the respective forward ends thereof to both sides of a rear end portion of said pipe member.

4. A frame structure according to claim 1, wherein:
   said intermediate portions of said plate members have a larger width dimension than that of said front and rear portions.

5. A frame structure according to claim 1, wherein:
   said vehicle is provided with a fuel tank; and
   said upper parts of said substantially vertically extending intermediate portions of said plate members support said fuel tank by said flange portions.

6. A frame structure according to claim 1, wherein:
   said vehicle is provided with a swing unit which comprises a suspension for rear wheels of said vehicle; and
   said intermediate portions of said plate members pivotably support said swing unit.

7. A frame structure according to claim 1, wherein:
   at least three said cross members are provided; and said front portions, said intermediate portions and said rear portions of said plate members are each provided with at least one said cross member.

8. A frame structure according to claim 1, wherein: said flange portions are formed at said upper edges.

9. A frame structure according to claim 8, wherein: said flange portions are also formed at said lower edges.

10. A frame structure according to claim 9, wherein: said plate members are provided with inwardly bent flange portions formed at said lower edges.

11. A frame structure according to claim 8, wherein: said flange portions are continuously formed substantially along the lengths of said plate members.

12. A frame structure according to claim 8, wherein: said flange portions are formed substantially along the lengths of said plate members except rear end portions of said plate members.

13. A frame structure according to claim 12, wherein: at least one of upper and lower edges of each of said rear end portions of said plate members is formed with an inwardly bent flange portion.

14. A frame structure according to claim 13, wherein: said inwardly bent flange portion is formed at both said upper and lower edges of each of said rear end portions.

15. A frame structure according to claim 1, wherein: said vehicle is provided with a wire harness; and said plate members comprise holder members for wiring of said wire harness.

16. A frame structure according to claim 1, wherein: said vehicle comprises a scooter-type vehicle.

17. A frame structure according to claim 1, wherein: said vehicle comprises a three-wheeled vehicle provided with an engine.

* * * * *